United States Patent [19]
Putkowski

[11] 3,862,596
[45] Jan. 28, 1975

[54] PRESS WITH ADJUSTABLE PLATEN LATCHING MECHANISM

[76] Inventor: Ladislao (Wladyslaw) Putkowski, 21 Limarick Ave., Weston; Ontario, Canada

[22] Filed: Aug. 22, 1973

[21] Appl. No.: 390,564

[52] U.S. Cl.............. 100/219, 100/257, 100/264, 100/269 R, 308/3 A, 425/450 R, 425/DIG. 223
[51] Int. Cl............................................. B30b 7/04
[58] Field of Search........ 100/219, 244, 264, 269 R, 100/257, 295; 308/3 R, 3 A; 425/394, 406, 450 C, 450 R, DIG. 221, DIG. 223

[56] References Cited
UNITED STATES PATENTS

| | | | |
|---|---|---|---|
| 2,711,561 | 6/1955 | Studli | 425/DIG. 223 |
| 3,310,842 | 3/1967 | Fischbach | 425/450 |
| 3,505,708 | 4/1970 | Moslo | 425/DIG. 223 |
| 3,606,638 | 9/1971 | Putkowski | 425/450 C |

Primary Examiner—Billy J. Wilhite
Attorney, Agent, or Firm—Bereskin & Parr Rogers

[57] ABSTRACT

A press having movable and fixed platens, a pair of tie bars secured to the fixed platen, and a pair of support bars pivotally connected to opposed sides of the movable platen and having teeth to engage teeth of the tie bar to lock the platens together when desired. An actuating member is connected through a linkage to the movable platen to move the latter to an adjustable preselected position in which further movement is blocked by an adjustable stop device, at which time continued movement of the actuating member causes the linkage to pivot the support bars to engage the tie bars, locking the platens together for pressing. After pressing, the actuating member is withdrawn, causing the linkage to disengage the support bars from the tie bars and then to withdraw the movable platen. Both platens can be movable if desired.

27 Claims, 16 Drawing Figures

PRESS WITH ADJUSTABLE PLATEN LATCHING MECHANISM

This invention relates to press of the kind having a two stage stroke, and more particularly it relates to improved operating and latching means for the movable platen of such a press.

In my U.S. Pat. No. 3,606,638 issued Sept. 21, 1971, there is disclosed a press with a pair of platens, one of which moves through part of the stroke before force is applied to an object to be pressed. After the movable platen is positioned, a pair of tie bars lock the platens together. When force is applied to the object, the high reaction forces are transmitted to the tie bars and not to the mechanism which moves the platens. An advantage of this arrangement is that only a low power light constructed mechanism is needed to move the movable platen, and hence most of the stroke of the press is accomplished at low power. However, in a press of this kind the movable platen must be accurately positioned before the tie bars lock the platens together. Positioning the movable platen is time consuming, especially if it is often necessary to change the location of the movable platen before applying the high force.

Accordingly, it is an object of the present invention to provide a press in which the platens are automatically located and locked in a preselected position before high force is applied. In a typical embodiment of the invention this is achieved by connecting a pair of tie bars to one platen, and pivotally connecting a pair of support bars to opposed sides of the other or movable platen. The support bars have teeth which cooperate with the tie bar teeth, so that the support bars may be swung into and out of engagement with the tie bars to lock the two platens together or to disconnect them. An actuating member and linkage or linking means are provided to move the movable platen towards the stationary platen, and an adjustable stop device is provided to stop the movable platen at a preselected location while allowing the actuating member to continue its motion. Such continued motion of the actuating member causes the linkages means to pivot the support bars into engagement with the tie bars, lockint the two platens together. Next, the short high power stroke of the press may be effected, after which the actuating member may be withdrawn. At this time the linkage means pivots the support bars out of engagement with the tie bars to unlock the movable platen and then allows the actuating member to withdraw the movable platen.

If desired, both platens can be made movable.

Further objects and advantages of the invention will appear from the following disclosure, taken together with the accompanying drawings, in which.

Figure 1:
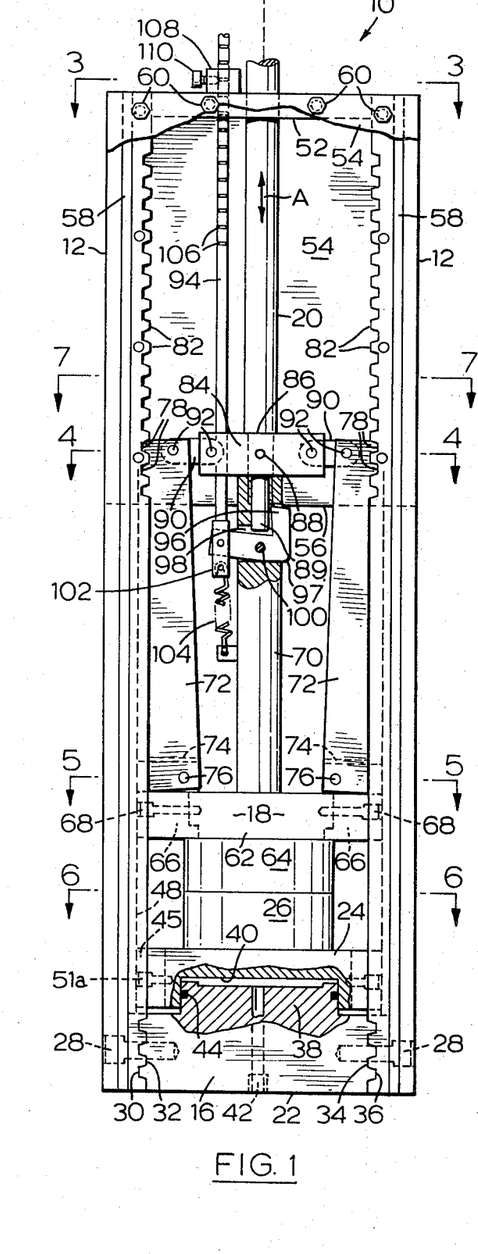
FIG. 1 is a side sectional view, partly broken away of a first embodiment of the present invention showing the movable platen locked to the tie bars.
Figure 2:
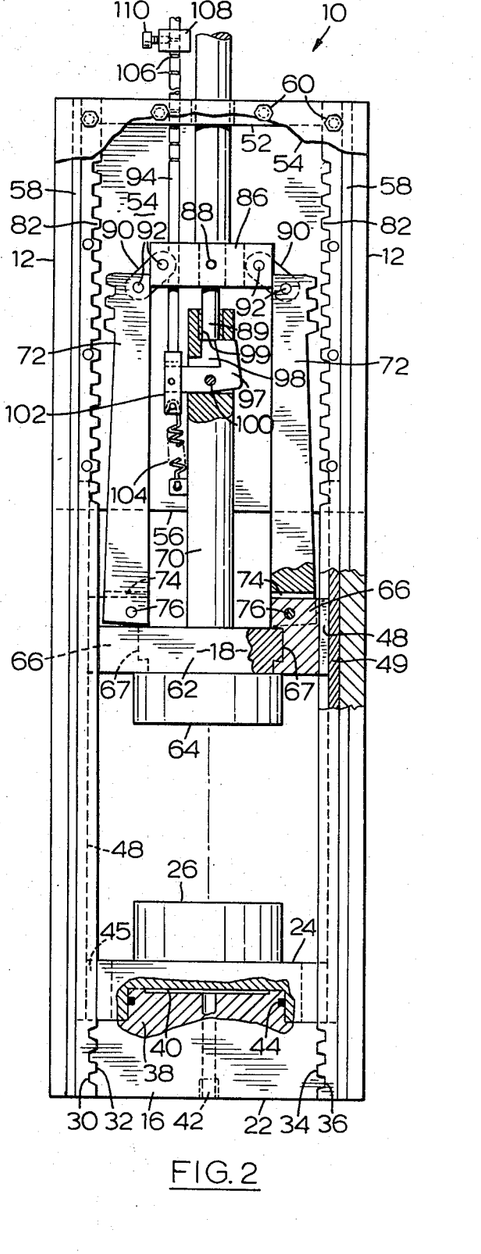
FIG. 2 is also a side sectional view, partly broken away, of the embodiment shown in FIG. 1 but showing the movable platen when it is not locked to the tie bars.
Figure 3:
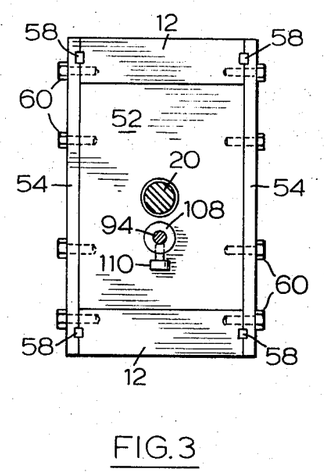
FIG. 3 is a top view taken along lines 3—3 of FIG. 1.
Figure 4:
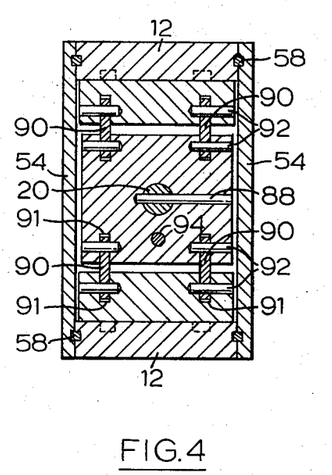
FIG. 4 is a sectional view taken along lines 4—4 of FIG. 1 showing the linkage mechanism.
Figure 5:
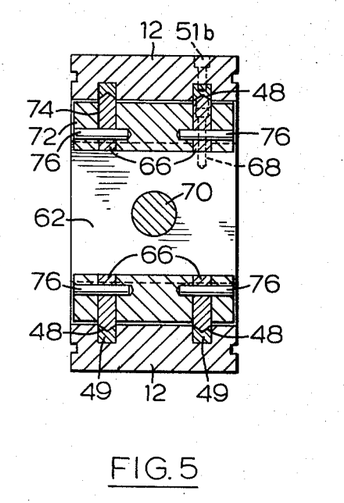
FIG. 5 is a sectional view taken along lines 5—5 of FIG. 1 showing the wear inserts which guide the movable platen while it is being positioned.

Referring firstly to FIG. 1 to FIG. 6 there is shown in FIGS. 1 and 2 a press generally indicated by reference numeral 10, for applying forces to an object in a longitudinal direction. A pair of wide parallel tie bars 12 are located in opposed relationship and between them are located a lower stationary platen 16 and an upper movable platen 18. (The press can be oriented as desired, e.g. on its side.) The object to be pressed is located between platens 16, 18.

Movable platen 18 is moved up and down between tie bars 12 along a path indicated by arrow A, by a shaft 20 which is connected to a piston and cylinder or other type of actuator diagrammatically indicated at 21. The actuator 21 is fixed to the tie bar structure by means not shown. When an object is to be pressed between platens 16, 18, the movable platen 18 is locked to tie bars 12 as will be discussed below, to prevent it from moving vertically.

The lower stationary platen 16 includes a rectangular base plate 22 (see also FIG. 6), a cap 24, and a pressure plate 26 which may be a mold or a die. The stationary platen 16 is connected to the tie bars 12 by bolts 28 extending into the side faces of base plate 22. Transverse mating teeth 30, 32 and 34, 36 are cut into cooperating surfaces of the tie bars 12 and the side faces of base plate 22, to absorb the forces generated during a pressing operation. This arrangement locks the bottom ends of the tie bars together in parallel relations.

The base plate 22 is formed with a piston 38 in its upper surface. The cap 24 is formed with a cylinder 40 in its lower surface which is fitted over piston 38. The piston 38 and cylinder 40, which form a short stroke high power actuator for presing an object located between the platens, are actuated hydraulically by fluid supplied through an orifice 42 in base plate 22. A seal ring 44 is provided in piston 38 to prevent hydraulic fluid from leaking from cylinder 40.

Figure 6:
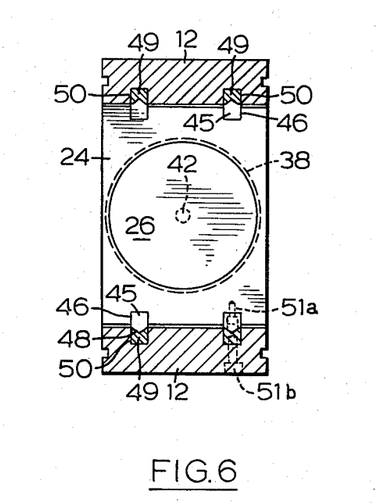
FIG. 6 is a sectional view taken along lines 6—6 of FIG. 1 showing the force applying apparatus fitted into the fixed platen.

To guide the cap 24 during its upward and downward movement in a pressing operation, guide bars or wear plates 45 (FIG. 6) are set in channels 46 in the cap 24. The guide bars 45 slide in co-operating V-shaped grooves or wear channels 48 formed in wear inserts or liners 49 mounted in channels or guide slots 50 in tie bars 12. Guide bars 45 are connected to cap 24 by screws 51a and wear inserts 49 are connected to tie bars 12 by screws 51b (FIG. 6). Pressure plate 26 is secured to the cap 24 so that the cap 24 moves vertically, so does pressure plate 26. During a pressing operation, the pressure plate 26 thus serves to apply pressure to and receive forces from an object being pressed, which is located between pressure plate 26 and upper movable platen 18. After a pressing operation, when fluid pressure in the cylinder 40 is reduced, the pressure plate 26 and cap 24 are retracted either by gravity, or by hydraulic or mechanical retractors such as springs (not shown).

The upper ends of the tie bars 12 are supported by a pair of side plates 54 (see FIG. 3) which extend partially down the sides of the press 10 and terminate at lower edges 56 located just above the uppermost position of the upper movable platen 18. Keyways 58 are located in the co-operating surfaces of tie bars 12 and side plates 54 to locate and maintain tie bars 12 parallel to each other. Keyways 58 are shown as extending along the full length of the edges of tie bars 12 but it is only necessary that they extend to the lower edges 56 of the side plates 54. Side plates 54 support a top plate 52 and are connected to tie bars 12 and top plate 52 by bolts 60 extending through mating surfaces of tie bars 12 and top plate 52. The actuating shaft 20 which raises and lowers the movable platen 18, extends through the top plate 52.

The movable platen 18 includes a rectangular base plate 62 having a pressure plate 64 which may be a mold or a die secured thereto. The pressure plate 64 serves during pressing to apply pressure to and to receive reaction forces from an object located between the platens.

The base plate 62 is guided during its up and down movement by guide bars or wear plates 66 (see FIG. 5) set into channels 67 (see FIG. 2) in the base plate. The guide bars 66 fit into the co-operating V-shaped grooves or wear channels 48 formed in the wear inserts or liners 49 mounted in tie bars 12. The guide bars 66 are connected to base plate 62 by screws 68 while the wear inserts 49 are, as previously indicated, connected to the tie bars 12 by screws 51b.

The movable platen 18 further includes a centre post 70 extending upwardly from the centre of base plate 62, and a pair of support bars 72 located at opposed sides of the base plate 62. The support bars 72 are connected to the base plate 62 on the guide bars 66. Specifically, the guide bars 66 are loosely fitted into slots 74 in the lower ends of support bars 72. Pivit pins 76 are then inserted through support bars 72 and through the guide bars 66 to allow support bars 72 to pivot towards and away from the central axis of the press 10. It should be noted that pivot pins 76 serve only to support the weight of the movable platen and are not required to absorb any of the forces generated during a pressing operation. Instead, such forces are conducted from base plate 62 to support bars 72 since the bottom surfaces of support bars 72 are in contact with the top surface of base plate 62 during a pressing operation.

The upper portions of the support bars 72 are provided, at their surfaces facing the bars 12 with sets of teeth 78. The teeth 78 mate with co-operating sets of teeth 82 on the surfaces of tie bars 12 facing movable platen 18. It will be noted that the teeth are generally triangular in cross-section, with a relatively long pitch and consequently with relatively thick roots, so as to better withstand forces tending to shear them off during a pressing operation.

In the view shown in FIG. 1, the teeth on the support bars 72 and on the tie bars 12 are engaged, so that the two platens 16, 18 are locked together through the tie bars against movement apart relative to each other along the path of travel of movable platen 18, indicated by arrow A. Thus, during a pressing operation on an object between the platens, the forces tending to move the platens apart are transmitted from the upper movable platen 18, through the co-operating teeth on support bars 72 and tie bars 12 to the tie bars, and then through the co-operating teeth on the tie bars and the lower platen to the lower platen.

Means are provided to swing support bars 72 away from tie bars 12 so that the position of the upper platen 18 can be changed. These means include a linkage mechanism 84 (FIGS. 1, 2 and 4) which includes a centre plate 86 mounted on shaft 20 and secured thereto by a pin 88. Centre plate 86 is located on shaft 20 so that part of shaft 20 extends below centre plate 62 to form a guide pin 89. Linkage mechanism 84 also includes four links 90 loosely fitted into slots 91 located in the centre plate 86 and support bars 72. Links 90 are connected to centre plate 86 and support bars 72 by pivot pins 92. When it is desired to swing the support bars 72 away from tie bars 12, and towards the central axis of the press so that the position of platen 18 may be varied, shaft 20 is moved upwardly. This upward movement of shaft 20 causes centre plate 86 to move upwardly and consequently links 90 are rotated pulling support bars away from tie bars 12. This disengages the co-operating teeth on the support bars 72 and the tie bars 12. As shaft 20 continues to move upwardly, movable platen 18 is moved upwardly to a new position as shown in FIG. 2.

Stop means are provided to automatically locate the movable platen 18 in a preselected position and to enable the linkage mechanism 84 to lock the movable platen 18 to the tie bars 12. In the preferred embodiment, these stop means include adjusting bar or member 94 which is connected to a latch mechanism 96. The latch mechanism 96 includes an L-shape lever 97 which is located in a transverse slot 98 in centre post 70. The lever 97 is connected to centre post 70 by a pivot pin 100.

As seen in FIG. 2, the upper end of centre post 70 is formed with a central bore 99 which accommodates the guide pin 89 of shaft 20, so that guide pin 89 can slide vertically inside central bore 99. When guide pin 89 is in its upper position, lever 97 pivots about pivot pin 100 into its engaged position, so that the upper end of lever 97 is positioned under guide pin 89 to hold guide pin 89 in its upper position. In this position movable platen 18 is prevented from moving relative to shaft 20. The latch mechanism 96 also incudes a connector 102, which pivotally connects adjusting bar 94 to lever 97, and a spring 104 connected between the connector 102 and the centre post 70 to bias lever 97 to its engaged position as shown in FIG. 2.

Adjusting bar 94 extends upwardly from connector 102 through guide holes in both the centre plate 86 and the top plate 52. The upper end of adjusting bar 94 is formed with adjusting grooves or locating recesses 106, which are spaced apart along the adjusting bar 94 at intervals equal to the pitch of teeth 82 formed in tie bars 12. A stop member 108 is slidably mounted on the upper end of adjusting bar 94 and can be releasably fastened to adjusting bar 94 at a position corresponding to any adjusting groove 106 by means of a clamping screw 110.

The operation of the stop means commences when the movable platen 18 is in the unlocked mode as shown in FIG. 2. Stop member 108 is secured to adjusting bar 94 at any desired adjusting groove 106. As shaft 20 commences to move downwardly, movable platen 18, linkage mechanism 84, and adjusting bar 94 also move downwardly. As top member 108 comes into contact with top plate 52, adjusting bar 94 is prevented from moving downwardly but shaft 20 and movable platen 18 continue to move downwardly. Since centre post 70 continues to move downwardly, level 97 rotates about pivot pin 100 until lever 97 disengages from guide pin 89. At this point, since the adjusting bar 94, lever 97 and centre post 70 are all connected, the centre post 70 and thus the movable platen 18 are also prevented from moving further downwardly. However, since lever 97 is no longer engaged with guide pin 89, shaft 20 continues to move downwardly thereby also moving centre plate 86 downwardly. Since support bars 72 are prevented from moving downwardly, links 90 rotate, moving support bars 72 towards tie bars 12 until teeth 78 and 82 are engaged. At this point, centre plate 86 is resting against the top end of centre post 70, and support bars 72 are held in position by linkage mechanism 84.

It will be noted that possible pivoting of the support bars 72 out of engagement with tie bars 12 is resisted by position of linkage mechanism 84. Specifically, links 90 and centre plate 86 form an over-the-centre linkage abutting against the top of centre post 70 and positively locking the tops of support bars 72 against inward movement until shaft 20 is drawn upwardly. Forces generated by the pressing operation, which tend to move support bars 72 inwardly, are transmitted through links 90 and tend to push centre plate 86 down onto centre post 70.

To unlock the movable platen 18 from the tie bars and allow it to move vertically, shaft 20 is drawn upwardly. Since support bars 72 are engaged with tie bars 12, centre plate 86 is pulled upwardly and guide pin 89 is withdrawn from centre post 70. As centre plate 86 moves upwardly, links 90 rotate pulling support bars 72 inwardly out of engagement with tie bars 12. Just before support bars 72 become disengaged from the tie bars, guide pin 89 moves above lever 97 allowing lever 97 to pivot under the influence of spring 104 into engagement with guide pin 89, again preventing movable platen 18 from moving relative to shaft 20. As lthe shaft 20 continues to move, it lifts the movable platen 18 via the links 90 and support bars 72.

In summary, the steps that will typically be following during a pressing operation for the press shown in FIGS. 1 to 6 are as follows.

First, the support bars 72 are contracted (if they were previously in engagement with tie bars 12), by moving shaft 20 upwardly. Next, the movable platen 18 is moved upwardly until it is separated from the stationary platen 16 by a distance sufficient that an object to be pressed may conveniently be inserted between the two platens.

After the object has been inserted, the stop member 108 is positioned on adjusting bar 94 so that movable platen 18 will be lowered to the desired position corresponding to the height of the object to be pressed, with a desired clearance. Movable platen 18 is then moved downwardly until the stop means automatically stops platen 18 and linkage mechanism 84 locks movable platen 18 to tie bars 12. The locations of the adjusting grooves 106 are such that no matter on which groove 106 the stop member 108 is located, the movable platen 18 will always stop in a position such that the teeth 78 of support bars 72 always mate with the teeth 82 of the tie bars 12. This ensures that the platen 18 will not stop in an in-between position in which the teeth do not fully engage.

After this first stage of the press stroke is completed, the high force actuator, in the form of piston 38 and cylinder 40 in stationary platen 16, is then actuated. The object in question is then pressed by moving dpressure plate 26 upwardly, completing the second stage of the stroke of the press. After the pressing operation is completed, hydraulic pressure in the cylinder 40 is reduced, and pressure plate 26 is retracted. The object being pressed may then be removed from the press.

It will be apparent that the maximum high power stroke of the press is not limited by the extent to which pressure plate 26 can be moved upwardly by piston 38 and cylinder 40. Instead, the length of the stroke over which pressure may be applied depends primarily on the length over which movable platen 18 may be locked to tie bars 12, i.e., it depends primarily on the length of the tie bars and number of teeth provided thereon. By moving movable platen 18 downwardly after each high pressure stroke of piston 38 and cylinder 40, a multiple stroke method may be used to execute a long stroke at fully power.

Reference is next made to FIGS. 7 to 10 which show another embodiment of a movable platen which may be used in the press shown in FIGS. 1 to 6. Primed reference numerals are used to indicate corresponding parts.

Figure 7:
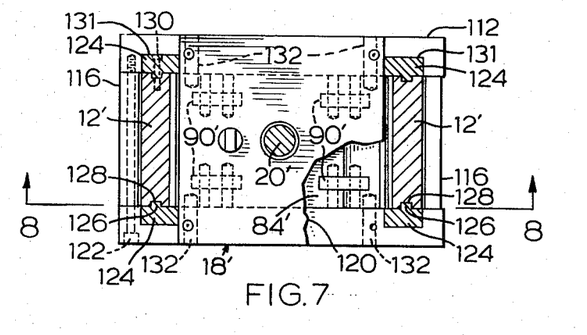
FIG. 7 is a top sectional view of a second embodiment of a movable platen (if this embodiment were used in the press shown in FIG. 1, the view shown in FIG. 7 would be taken along lines 7—7 of FIG. 1)
Figure 8:
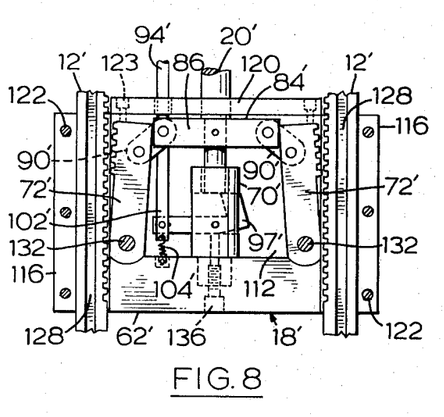
FIG. 8 is a side sectional view taken along lines 8—8 of FIG. 7 showing the movable platen when it is not locked to the tie bars.
Figure 9:
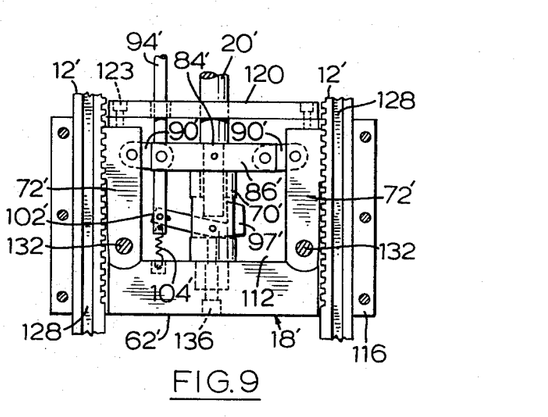
FIG. 9 is a side sectional view also taken along lines 8—8 of FIG. 7, but showing the movable platen locked to the tie bars.

In the apparatus shown in FIGS. 7 to 9, the movable platen 18' has a box-type construction enclosing tie bars 12'. The enclosing box includes a base plate 62', a pair of side plates 112, a pair of end plates 116, and a top plate 120. A pair of support bars 72' and a centre post 70' are located inside the enclosing box. Side plates 112 are connected to end plates 116 by means of bolts 122, one of which is shown in FIG. 7. Top plate 120 is connected to side plates 112 by bolts 123 (FIGS. 8 and 9) which extend through the top edges of side plates 112, so that tie bars 12' are able to extend vertically through openings between top plate 120 and end plates 116 respectively.

Wear plates 124 (FIG. 7) are locatd on the edges of tie bars 12' by means of flanges 126 on wear plates 124, and longitudinal slots 128 in tie bars 12'. Screws 130 through wear plates 124 connect wear plates 124 to tie bars 12'. Side plates 112 are formed with guide slots 131 to accommodate wear plates 124 to guide movable platen 18' in its up and down movement.

Either end plates 116 or wear plates 124 and guide slots 131 form retaining means for preventing tie bars 12' from moving apart relative to each other during a pressing operation. If desired, end plates 116 could be eliminated from this embodiment if wear plates 124 and guide slots 131 are used, and vice versa.

Base plate 62' is located between the side plates 112, and is connected to side plates 112 by any suitable means (not shown), so that tie bars 12' are able to extend vertically through openings between base plate 62' and end plates 116. Support bars 72' are pivotally connected to side plates 112 by pivot pins 132, extending through side plates 112. Centre post 70' is connected to base plate 62' by screws 136 (FIGS. 8 and 9).

The stop means, with actuating bar 94', lever 97' and spring 104', are identical to those shown in FIGS. 1 to 6. The linkage mechanism 84' with centre plate 86' and links 90', is also identical to that shown in FIGS. 1 to 6.

The method of locking movable platen 18' to tie bars 12' and the operation of the stop means is identical to that described above for the apparatus shown in FIGS. 1 to 6. The advantage of using the movable platen shown in FIGS. 7 and 9 is that movable platen 18' is relatively short, thus reducing the overall length of the press. Also, the moving parts are substantially all enclosed, thus reducing the possibility of dirt interfering with the operation of the press.

Figure 10:
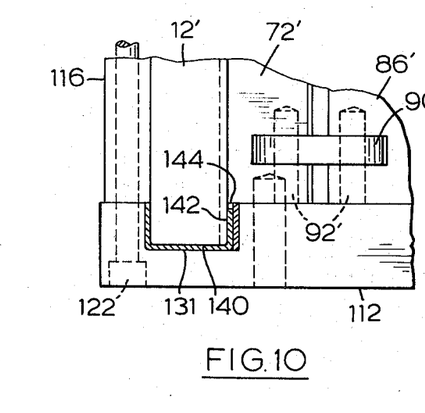
FIG. 10 is a top view of a corner of the embodiment shown in FIG. 7, but showing a modified support bar and guide slot.

Reference is next made to FIG. 10 which shows a top view of a corner of the embodiment shown in FIGS. 7 to 9. In the embodiment shown in FIG. 10, the wear plates 124 (FIG. 7) are formed as part of tie bars 12' by extending the width of tie bars 12', so that tie bar 12' extend into guide slots 131 formed in side plates 112. A wear liner 140, of heat treated highly polished thin metal plate, is attached to the surfaces of guide slot 131. A filler plate 142 is located between the wear liner 140 and the surface of tie bar 12' facing support bar 72'. Filler plate 142 is connected to a wear liner 140 so that a dust slot 144 is formed between tie bar 12' and wear liner 140. Dust slot 144 prevents dirt from entering the sliding area between tie bar 12' and wear line 140.

Figure 11:
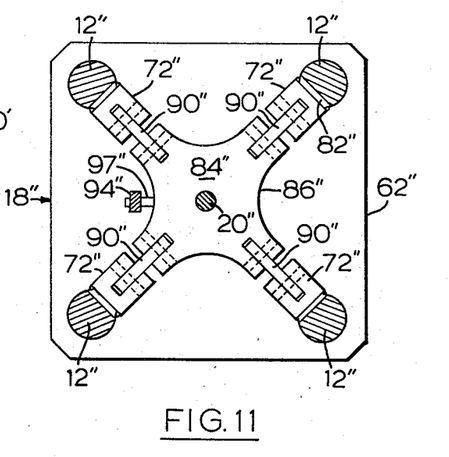
FIG. 11 is a top sectional view of a second embodiment of the present invention which uses four round tie bars rather than two rectangular tie bars (if this embodiment were used in the press shown in FIG. 1, the view shown in FIG. 11 would be taken along lines 7—7 of FIG. 1).

Reference is next made to FIG. 11, which shows another embodiment of the present inventin. In FIG. 11, double primed reference numerals are used to indicate parts which correspond with parts in the embodiments previously described.

FIG. 11 is a top view of a movable platen 18''0 which is used in a press which has four round tie bars 12'' (having however the usual substantially rectangular or square teeth 82''), rather than two rectangular tie bars as described above. The four tie bar embodiment can be used with the type of movable platen shown in FIGS. 1 to 6 or with that of FIGS. 7 to 10. The movable platen 18'' includes a base plate 62'', four support bars 72'' (one corresponding to each tie bar 12'') pivotally connected to base plate 62'' and a linkage mechanism 84''.

Linkage mechanism 84'' includes a centre plate 86'' connected to shaft 20'', and four links 90'' pivotally connected between centre plate 86'' and support bars 72''. Adjusting bar 94'' is shown with lever 97'' connected thereto, but the remainder of the latch mechanism is not shown, since it is identical to that described above.

The operation of the embodiment shown in FIG. 11 is identical to that of the previously described embodiments. The only difference is that four tie bars and supports bars are used to lock the movable platen rather than two. If desired, a different number of tie bars could be used (i.e. other than two or four), as long as the tie bars are evenly spaced so as not to generate excessive forces on any particular tie bar during a pressing operation. It is found that the round tie bars facilitate movement and guidance of the movable platen on the tie bars, while the square or rectangular teeth (which are the same shape as described for the rectangular tie bars) mate easily with the teeth of the support bars.

It will be appreciated that modifications may be made to the above described apparatus. Although the apparatus described is used to apply pressure to an object, it may readily be adapted to apply tensile forces to an object as well. By attaching suitable devices to the platens which are capable of pulling with respect to each other, high tensile forces can be applied to an object after the movable platen is locked to the tie bars.

By making suitable modifications, the tie bars and support bars of the present invention can be square or some other cross-section, instead of the rectangular or round cross-sections shown. Simply by changing the shape of the support bars, so that corresponding tie bar and support bar mating surfaces and teeth can be engaged sufficiently to withstand the reaction forces created during the pressing operation, different cross-sections may be employed.

Although, the press described above employs one movable and one fixed platen, it is possible to employ two movable platens in opposed relationship if this is desired. Finally, the shape of the tie bar and support bar teeth may be varied if desired, depending on the application.

Figure 12:
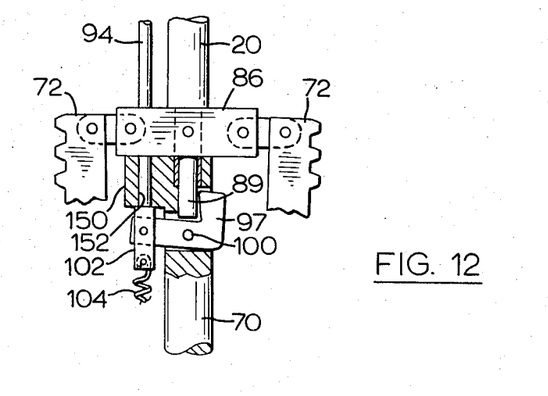
FIG. 12 is a portion of the view of FIG. 1 but showing a modification to the embodiment of FIG. 1.
Figure 13:
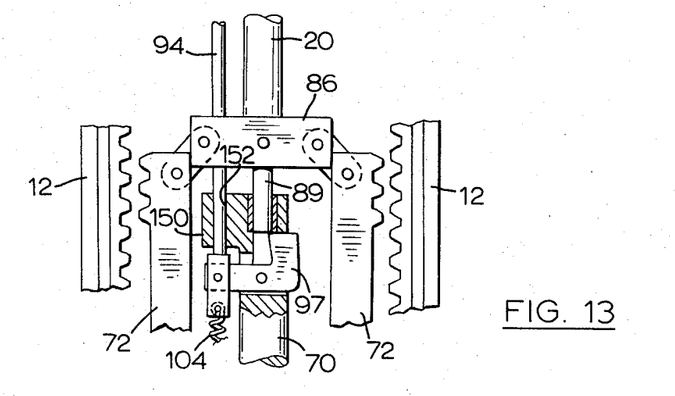
FIG. 13 is a portion of the view of FIG. 8 but showing a modification to the embodiment of FIG. 8.

Reference is next made to FIGS. 12 and 13, which show a minor modification of the embodiment of FIGS. 1 to 6. In the FIGS. 1 to 6 embodiment, kwhen the shaft 20 and hence the movable platen 18 is moved downwardly, the movable platen 18 must be stopped at a location which is accurately known. In the FIGS. 1 to 6 embodiment, after the stop member 108 (FIGS. 1 and 2) contacts the top plate 52, the movable platen 18 stops when the latch lever 97 has rotated to its maximum permissible extent about its pivot 100 (i.e. after latch lever 97 has rotated from the latched FIG. 1 position to the unlatched FIG. 2 position). Normally this positions the moving platen accurately, but at high speeds, the inertia of the parts can interfere with the positioning.

Therefore, as shown in FIGS. 12 and 13, an additional stop 150 may be added to the mechanism. The stop 150 is simply an integral extension of the post 70 at its top and contains a bore 152 through which adjusting rod 94 slides. FIG. 12 corresponds to FIG. 1 and shows the mechanism in a condition in which the movable platen is locked, while FIG. 13 corresponds to FIG. 2 and shows the mechanism as it moves up or down. It will be seen in FIG. 12 that when the latch lever 97 pivots clockwise to the limit of its travel, it carries connector 102 up into contact with the stop 150, thereby preventing further pivoting of the latch lever 97. Since lever 97 is connected to post 70 by pin 100, this stops further downward movement of post 70 and the movable platen 18. Stop 150 thus forms a second and very positive stop for locating platen 18. It is found that platen 18 can even at high speeds be located within a fiew thousandths of an inch with the use of stop 150.

It will be appreciated dthat the same modification may be made to the FIGS. 7 to 9 embodiment, i.e., the post 70' can be extended to the left to form a stop (not shown) with the adjusting bar 94' passing therethrough, and a collar (not shown) can be fixed to the bar 94' to abut against the stop on the post 70' after the latch lever 97' has pivoted clockwise to its unlatched position.

Figure 14:
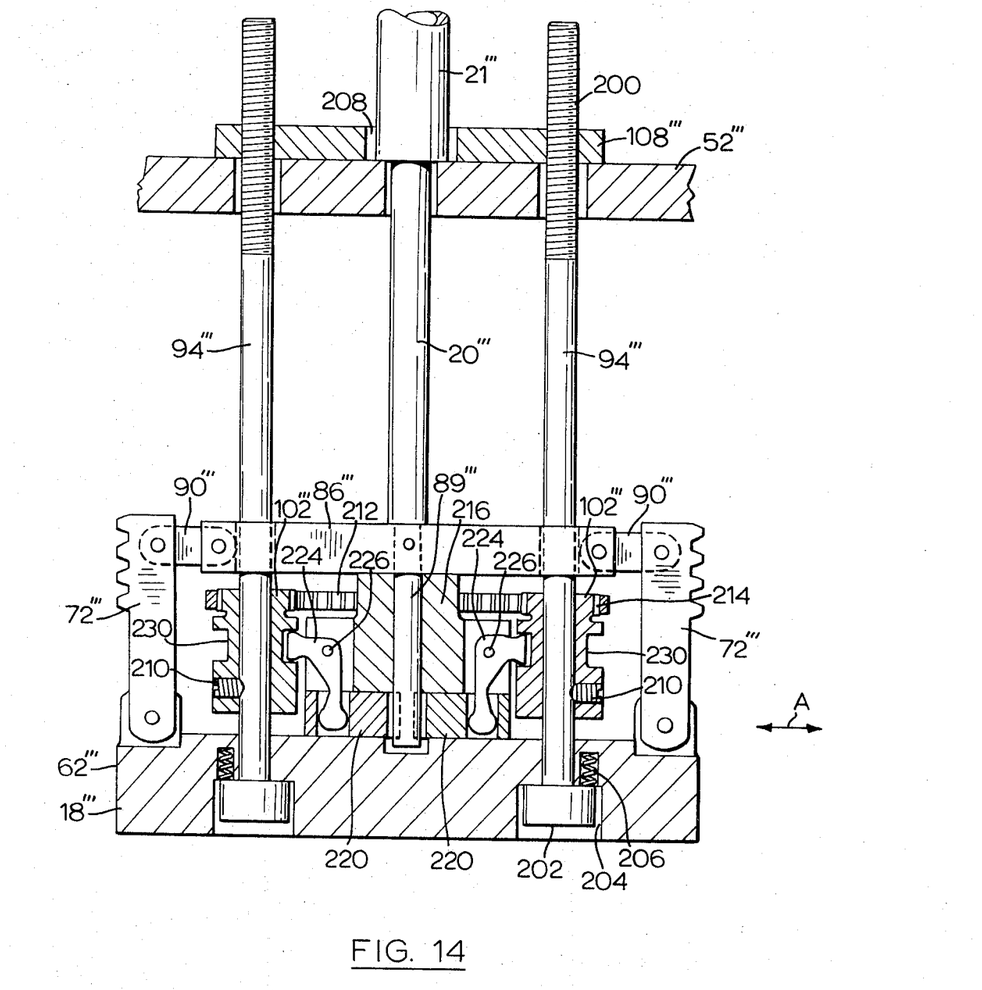
FIG. 14 is a side sectional view of another embodiment of the invention and showing the movable platen in a locked condition.
Figure 15:
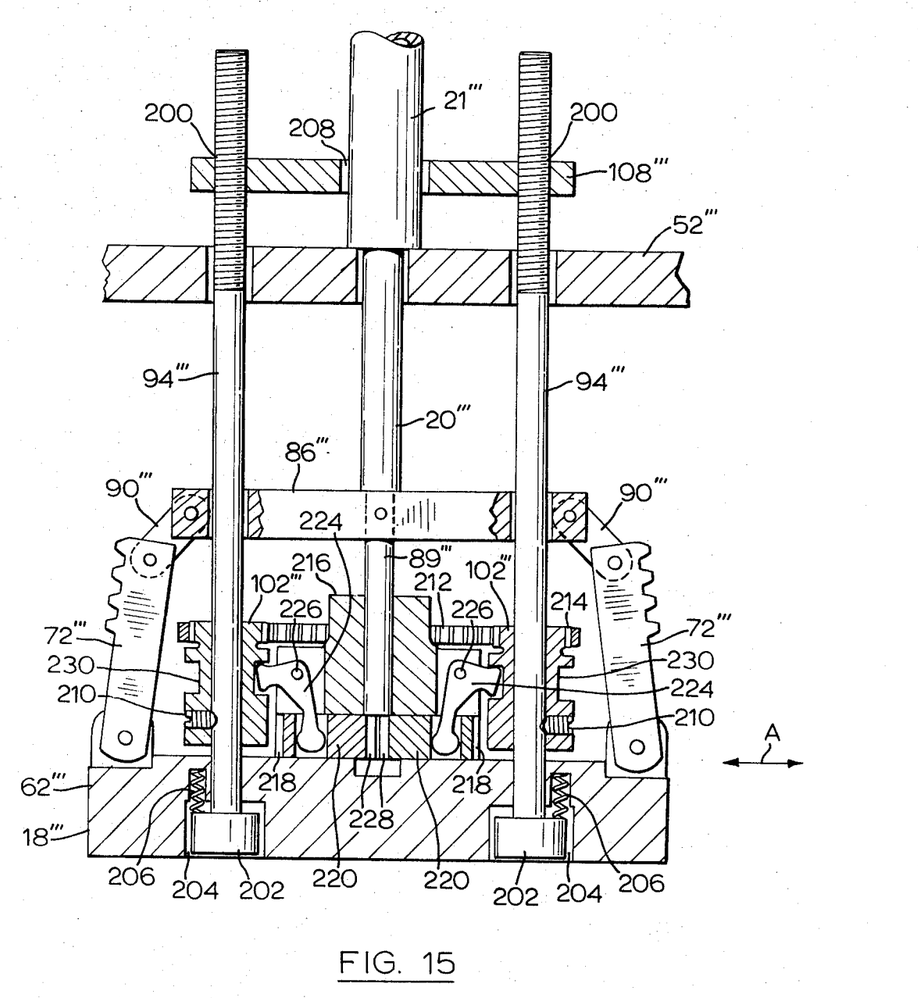
FIG. 15 is a side sectional view of the embodiment of FIG. 1 showing the movable platen in an unlocked condition.
Figure 16:
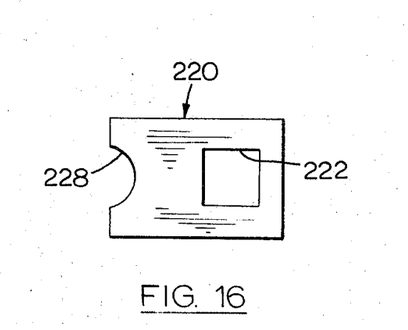
FIG. 16 is a top view of a slide plate of the FIGS. 14 and 15 embodiment.

Reference is last made to FIGS. 14 to 16, which show a modified arrangement to be used if it is desired to employ two or more adjusting bars and to be able to adjust their positions together in a single operation. In FIGS. 14 to 16, triple primed reference numerals indicate parts corresonding to those of FIGS. 1 to 6.

In the FIGS. 14 to 16 embodiment the adjusting bars 94''', of which two are shown, are secured to a large stop plate 108''' by a mating thread 200. The adjusting bars extending slidably through the pressure plate 62''' and terminate in heads 202 located in sockets 204 in the pressure plate 62'''. Springs 206 bias the bars 94''' downwardly relative to the pressure plate 62'''. As the bars 94''' move up or down in response to movements of the pressure plate 62, the stop plate 108''' moves with them. The stop plate 108''' therefore contains a hole 208 to accommodate the actuator 21'''.

Secured to each adjusting bar 94''' is a stop-stroke member 102'''. The stop-stroke members 102'''0 is a stop-stroke member 102'''. The stop-stroke members 102''' are held fixedly on the bars 94 by set screws 210, are axially symmetrical, and can be turned in unison by a timing chain or belt 212 extending around teeth 214 at the tops of the members 102'''. As members 102''' are turned, the position of stop plate 108''' relative to adjusting bars 94''' is adjusted due to the threads 200.

Secured to the pressure plate 62''' (by means not shown) is a guide plate 216. The guide plate 216 defines with the pressure plate 62''' a slot 218 in which a pair of slide plates 220 (see also FIG. 16) may slide in the direction of arrow A. Each slide plate 220 contains a hole 222 (FIG. 16) to accommodate one end of a lever 224 pivoted on the guide plate 216 by a pin 226. Each slide plate 220 also includes, at its edge facing the other guide plate, a circular recess 228 which is less than a semi-circle.

The levers 224 are used to slide the slide plates 220 in and out in the direction of arrow A. Each lever has one end located in circumferential slot 230 in one of the stop-stroke members 102'''. As the stop-stroke members 102''' move up and down relative to the presure plate 62''' (as will be explained), the levers 224 pivot about pins 226 and slide the slide plates 220 towards or away from each other.

The overall operation of the FIGS. 14 and 16 embodiment is as follows. Assume, with reference to FIG. 15, that the actuator 21''' moves shaft 20''' downwardly. At this time the slide plates 220 are located with their opposed ends adjacent each other as shown in FIG. 15. The diameter of combined recesses 228 in the ends of the slide plates is less than that of pin 89''', so pin 89''' pushes down on the plates 220 and hence pushes the movable platen 18''' downwardly. Adjusting bars 94''' are moved downwardly because of the engagement of pressure plate 62''' (through springs 206) with their heads 202.

When the stop plate 108' hits top plate 52''' further downward movement of adjusting bars 94''' is prevented. The shaft 20''' and pressure plate 62''' can however continue moving down against the pressure of springs 206 until the heads 202 engage the inner ends of recesses 204. As the pressure plate 62''', and hence the slide plates 220, continue to move down, they turn levers 224 about pins 226, forcing the slide plates 220 away from each other to the FIG. 14 position. When the heads 202 have pulled up against the ends of recesses 204, the slide plates 220 have slid apart enough to allow pin 89''' to pass through the recesses 228. Movement of plate 62''' now stops, but the shaft 20''' and pin 89''' continue downwardly to the FIG. 14 position to spread the support bars 74''' and lock the platen 18''' against the tie bars (not shown). It will be seen that the movable platen 18''' is accurately and positively positioned by the stop plate 108''' and the engagement of the heads 202 in the recesses 204.

To raise platen 18''', shaft 20''' is lifted by actuator 21''', raising pin 89''' and unlocking the support bars 72''' from he tie bars. The springs 206 then force the heads 202 of the adjusting bars to the position shown in FIG. 15, rotating levers 224 and moving the slide plates toward each other to the FIG. 15 position.

It will be seen that springs 206 correspond generally in function to spring 104 of FIGS. 1 to 6, and the levers 224 and plates 220 together correspond to the latch lever 97 of FIGS. 1 to 6.

The FIGS. 14 to 16 embodiment allows as many adjusting bars 94''' as desired to be used, thus balancing the forces in large press. Not all of the bars 94'''i need be connected to a slide plate 220; only one slide plate 220 can be used if desired (the remaining adjusting bars 94''' then each lever 224 and plate 220). The positions of all the adjusting bars 94''' can be adjusted simultaneously and easily; for example the pitch of thread 200 can be made such that two turns of bars 94''' equals one pitch of the tie bar teeth. Detents (not shown) can be provided to stop the rotation of the adjusting bars at locations corresponding with those of the tie bar teeth. The bars 94''' can be rotated manually or can be motor driven.

What is claimed is;

1. In a machine for generating forces along a predetermined path for application to an object, said machine including:
   a. first and second platens, each extending in a plane perpendicular to said path,
   b. means supporting said platens in opposed relation with said first platen movable towards and away from said second platen along said path,
   c. said platens including opposed force receiving means for receiving reaction forces produced as a result of application of generated forces to said object,
   d. a pair of opposed elongated tie bars, and means for connecting said tie bars firmly to said second platen, said tie bars each having a set of teeth,
an improved motive and latching means for moving said first platen and for locking said first platen to said tie bars, comprising:

e. a pair of support bars, one associated with each tie bar and each having teeth engageable with the teeth of its associated tie bar,
f. means connecting said support bars to said first platen for movement between a disengaged position in which said teeth of said support bars are disengaged from said teeth of said tie bars and an engaged position in which said teeth of said support bars are engaged with said teeth of said tie bars,
g. an actuating member mounted for movement along said path towards and away from said first platen, and motive means for moving said actuating member along said path,
h. linking means interconnecting said actuating member, said support bars and said first platen for moving said first platen towards said second platen during movement of said actuating member towards said second platen,
i. adjustable blocking means connected to said linking means for stopping said first platen in a first selected position during such movement of said first platen towards said second platen,
j. said linking means including means for permitting continued movement of said actuating member, after said first platen has reached said first selected position, to a second selected position relative to said first selected location,
k. said linking mens further including means responsive to said continued movement for moving said support bars from their disengaged to their engaged position,
l. said linking means also including means responsive to movement of said actuating member from said second selected position in a direction away from said second platen for moving said support bars from their engaged to their disengaged position and for then moving said first platen away from said second platen.

2. Apparatus according to claim 1 wherein said linking means includes plate means rigidly secured to said actuating member, and a pluality of toggle links pivotally connected between said plate means and said support bars.

3. Apparatus according to claim 2 wherein said means for permitting continued movement comprises a latch member, means mounting said latch member for movement between a first latched position in which said latch member for movement member blocks movement of said actuating member towards said first platen and an unlatched position in which said latch member permits movement of said actuating member towards said first platen to said second selected position, means biasing said latch member to said latch position, and connecting means connected between said latch member and said blocking means for moving said latch member from said latched to said unlatched position at said first selected position of said first platen.

4. Apparatus according to claim 3 wherein said latch member is located between said plate means and said first platen, said connecting means comprising an adjusting rod mounted for movement parallel to said path of travel and extending slidably through said plate means, said blocking means comprising a first stop member fixed to said tie bars and a second stop member adjustably mounted on said adjusting rod and engageable with said first stop member to limit movement of said adjusting rod toward said second platen.

5. Apparatus according to claim 4 wherein said first platen includes a centre post projecting therefrom toward said plate mens and forming a stop limiting movement of said plate means toward said first platen when said actuating member is in said second selected position.

6. Apparatus according to claim 5 wherein said centre post includes a slot therein, said latch member being pivotally mounted in said slot, said centre post further including an axial bore therein at its free end and communicating with said slot, said actuating member including a guide pin projecting therefrom into said bore and normally engaging said latch member.

7. Apparatus according to claim 6 and including four said tie bars, arranged in opposed pairs, and there being four said support bars, one for each tie bar.

8. Apparatus to claim 7 wherein said tie bars are each of round cross-section but said teeth thereof are of substantially rectangular cross-section.

9. Apparatus according to claim 2 wherein said means for permitting continued movement comprises latch means, means mounting said latch means for movement between a first latched position in which said latch means blocks movement of said actuating member towards said first platen and an unlatched position in which said latch means permits movement of said platen to said second selected position, means biassing said latch means to said latched position, and connecting means connected between said latch means and said blocking means for moving said latch means from said latched to said unlatched piosition at said first selected position of said first platen.

10. Apparatus according to claim 9 wherein said latch means is located between said plate means and said first platen, said connecting mens comprising a plurality of adjusting rods mounted for movement parallel to said path of travel and extending slidably through said plate means, said blocking means comprising a first stop member fixed to said tie bars and a second stop member, said second stop member having a plurality of threaded apertures therein and each said adjusting rods extending through a said threaded aperture and having a thread mating with the thread in its associated aperture, whereby rotation of said adjusting rods will adjust the position of said second stop member relative to said adjusting rods, means for rotating said adjusting rods in unison, said second stop member being engageable with said first stop member to limit movement of said adjusting rods toward said second platen.

11. Apparatus according to claim 10 wherein said latch means includes a slider plate, means mounting said slider plate on said first platen for sliding movement transverse to said first platen between a first position in which said slider plate blocks movement of said actuating member towards said first platen and a second position in which said slider plate permits movement of said actuating member towards said first platen, said first position being said latched position and said second position being said unlatched position, a lever, means connecting said lever between said slider plate and one of said adjusting rods for moving said slider plate from said first to said second position at said first selected position of said first platen, said means connecting said lever including means permitting rotation of said one adjusting rod relative to said lever.

12. Apparatus according to claim 1 support bars each having a first and a second end, said first ends being pivotally connected to opposed sides of said first platen and said teeth of said support bars being located adjacent said second ends, said linking means being connected to support bars adjacent said second ends thereof.

13. In a machine for generating force along predetermined path for application to an object, said machine including:
 a. first and second platens, each extending in a plane perpendicular to said path,
 b. means supporting said platens in opposed relation with said first platen movable towards and away from said second platen along said path,
 c. said platens including opposed force receiving means for receiving reaction forces produced as a result of application of generated forces to said object,
 d. a pair of opposed elongated tie bars, and means for connecting said tie bars rigidly to opposite sides of said second platen, said tie bars each having a set of teeth,
an improved motive and latching means for moving said first platen and for locking said first platen to said tie bars, comprising:
 e. a pair of supprt bars, one associated with each tie bar and each having teeth engageable with the teeth of its associated tie bar,
 f. means pivotally connecting said support bars to opposed sides of said first platen for movement between disengaged position in which said teeth of said support bars are disengaged from said teeth of said tie bars and an engaged position in which said teeth of said support bars are engaged with said teeth of said tie bars,
 g. an actuating member mounted for movement along said path towards and away from said first platen, and motive means for moving said actuating member along said path,
 h. a plurality of toggle links, and means pivotally connecting said links between said actuating member and said support bars, for movement of said actuating member toward said first platen to move said links to move said support bars to said engaged position and for movement of said actuating member away from said first platen to move said links to move said support bars to said disengaged position,
 i. latch means coupled between said actuating member and said first platen for movement between a latched position in which said latch means limits movement of said actuating member towards said first platen, so that movement of said actuating member towards said second platen moves said first platen towards said second platen, and an unlatched position in which said actuating member can move towards said first platen,
 j. stop means adjustably connected to said first platen for blocking movement of said first platen toward said second platen at a preselected adjustable location along said path,
 k. coupling means coupling said latch means and said stop means for movement of said actuating member towards said second platen, with movement of said first platen towards said second platen substantially blocked by said stop means, to move said latch means from its latched to unlatched position,
 l. and means for moving said latch means from its unlatched to its latched position when said actuating member is moved along said path away from said first platen,
so that when said actuating member is moved towards said second platen, said first platen will move therewith until movement thereof is substantially blocked by said stop means, following which said latch means will move to its unlatched position and said actuating member will move towards said first plate to move said support bars to their engaged position, and when said actuating member is then moved away from said first platen, said support bars will be moved to their disengaged position and said latch means will return to its latched position, following which said support bars and first platen will be moved away from said second platen with said actuating member.

14. Apparatus according to claim 13 wherein said stop means includes:
 1. an adjusting member having a stop member adjustably mounted thereon;
 2. means mounting said adjusting member for movement parallel to said path and including means cooperating with said stop member for blocking movement of said adjusting member towards said second platen substantially when said first platen reaches said preselected position,
 3. and second coupling means coupling said adjusting member with said first platen to limit movement of said first platen towards said second platen when movement of said adjusting member towards said second platen is blocked by said stop member.

15. Apparatus according to claim 14 wherein said second coupling means includes a post member projecting from said first platen towards said actuating member, said second coupling mean comprising pivot means pivotally connecting said latch means to said post member.

16. Apparatus according to claim 15 wherein said adjusting member is pivotally connected to said latch member, and including means biasing said latch member to its latched position.

17. Apparatus according to claim 16 wherein said stop means further includes a further stop member fixed to said post member and cooperating with said adjusting member for blocking further rotation of said latch means after said latch has moved from its latched to its unlatched position, whereby positively to prevent further movement of said first platen toward said second platen.

18. Apparatus according to claim 15 and including four said tie bars arranged in opposed pairs, and there being four said support bars, one for each tie bar.

19. Apparatus according to claim 18 wherein said tie bars are each of round cross-section but said teeth thereof are of substantially rectangular cross-section.

20. Apparatus according to claim 14 wherein said latch means comprises an L-shaped latch member, said second coupling means including a post member projecting from said first platen toward said actuating member, said post member having a slot therein, said second coupling means comprising pivot means pivotally mounting said latch member in said slot, said latch member having an abutment surface to engage said actuating member when said latch means is in its latched position, said unlatched position of said latch means being a position in which said latch member is pivoted so that said abutment surface is clear of the path of movement of said actuating member.

21. Apparatus according to claim 14 wherein said adjusting member is an elongated shaft having a plurality of locating recesses therein, and clamping means for locating said stop member over each said recess, each recess corresponding to a position of said stop member over each said recess, each recess corresponding to a position of said stop member at which said teeth of said support bars mate with said teeth of said tie bars.

22. A machine for generating forces along a predetermined path for application to an object, said machine comprising:
   a. first and second platens, each extending in a plane perpendicular to said path,
   b. means supporting said platens in opposed relation with said first platen movable towards and away from said second platen along said path,
   c. said platens including opposed force receiving means for receiving reaction forces produced as a result of application of generated forces to said object,
   d. a pair of opposed elongated tie bars, and means for connecting said tie bars firmly to said second platen, said tie bars each having a set of teeth,
   e. said first platen including a box-type enclosure having a base plate located between said tie bars and extending in a plane perpendicular to said path, a top plate parallel to the base plate and spaced therefrom, a pair of spaced apart parallel side plates connected to said base and top plates so that said tie bars are located between the side plates and adjacent to the base and top plates,
   f. said first platen including retaining means located adjacent to said tie bars for preventing said tie bars from moving apart relative to each other during a pressing operation,
   g. a pair of support bars located inside said box-type enclosure, one associated with each tie bar and each having teeth engageable with the teeth of its associated tie bar,
   h. means connecting said support bars to said first platen for movement between a disengaged position in which said teeth of said support bars are disengaged from said teeth of said tie bars and an engaged position in which said teeth of said support bars are engaged with said teeth of said tie bars,
   i. an actuating member mounted for movement along said path towards and away from said first platen, and motive means for moving said actuating member along said path,
   j. linking means connecting said actuating member and said first platen for moving said first platen towards and away from said second platen consequent upon movement of said actuating member towards and away from said second platen,
   k. and locking means connected with said support bars for moving said support bars between said disengaged and said engaged positions.

23. Apparatus according to claim 22 wherein said locking means includes means coupled to said linking means and responsive to continued movement of said actuating member towards said second platen after said first platen has moved toward said second platen to a predetermined position, for preventing further movement of said first platen toward said second platen and for moving said support bars to said engaged position.

24. In a machine for generating forces along a predetermined path for application to an object, said machine including:
   a. first and second platens, each extending in a plane perpendicular to said path,
   b. means supporting said platen in opposed relation with said first platen movable towards and away from said second platen along said path,
   c. said platens including opposed force receiving means for receiving reaction forces produced as a result of application of generated forces to said object,
   d. a pair of opposed elongated tie bars, and means for connecting said tie bars firmly to said second platen, said tie bars each having a set of teeth, an improved guiding means for controlling the movement of said first platen and supporting the first platen during a pressing operation, comprising:
   e. guide means comprising a plurality of guide slots in one of said first platen and said tie bars and extending in the direction of said path and adjacent to the other of said first platen and said tie bars,
   f. a wear liner located in each of said guide slots and connected to said one of said first platen and said tie bars, said wear liners defining wear channels extending along said path,
   g. said other of said first platen and said tie bars including wear plates adjacent to said wear channels and extending along said path,
   h. said wear plates extending into said wear channels so that said wear plates are prevented from moving transversely to said wear channels, and are permitted to move slidably along said path.

25. Apparatus acording to claim 24 wherein said guide slots are formed in said first platen and said tie bars include said wear plates.

26. Apparatus according to claim 24 wherein said guide slots are formed in said tie bars and said first platen includes said wear plates.

27. Apparatus according to claim 24 wherein said wear liner includes a filler plate adjacent to said wear plate to form a dust slot adjacent to said teeth.

* * * * *